(12) United States Patent
Harnsberry et al.

(10) Patent No.: US 11,987,745 B2
(45) Date of Patent: May 21, 2024

(54) SOLVENT MIXTURES FOR DOWNHOLE ELEMENTAL SULFUR REMOVAL AND FORMATION STIMULATION

(71) Applicant: ExxonMobil Technology and Engineering Company, Spring, TX (US)

(72) Inventors: Kevin A. Harnsberry, Beaumont, TX (US); Paul Scott Northrop, Lexington, KY (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 0 days.

(21) Appl. No.: 18/332,821

(22) Filed: Jun. 12, 2023

(65) Prior Publication Data

US 2023/0323189 A1 Oct. 12, 2023

Related U.S. Application Data

(62) Division of application No. 17/936,282, filed on Sep. 28, 2022, now Pat. No. 11,739,251, which is a (Continued)

(51) Int. Cl.
*C09K 8/532* (2006.01)
*C09K 8/74* (2006.01)
(Continued)

(52) U.S. Cl.
CPC ............. *C09K 8/532* (2013.01); *C09K 8/74* (2013.01); *E21B 43/26* (2013.01); *E21B 43/28* (2013.01)

(58) Field of Classification Search
None
See application file for complete search history.

(56) References Cited

U.S. PATENT DOCUMENTS

| 3,531,760 A | 9/1970 | Whitfill, Jr. |
| 3,846,311 A | 11/1974 | Sharp et al. |
| (Continued) | | |

FOREIGN PATENT DOCUMENTS

| GB | 2109034 A | * 5/1983 | ............... C09K 8/74 |
| GB | 2109034 A | 5/1983 | |

*Primary Examiner* — Charles R Nold
(74) *Attorney, Agent, or Firm* — ExxonMobil Technology and Engineering Company—Law Department

(57) ABSTRACT

Solvent mixtures for downhole elemental sulfur removal and formation stimulation, and methods for utilizing such solvent mixtures, are described herein. One method includes providing a solvent mixture that includes an elemental sulfur solvent fraction and an odorant fraction that includes a lactate ester solvent. The method also includes injecting the solvent mixture into a hydrocarbon well such that the elemental sulfur solvent fraction of the solvent mixture dissolves elemental sulfur deposited on well components, and contacting the solvent mixture with water such that the lactate ester solvent within the odorant fraction reacts with the water to generate lactic acid. The method further includes stimulating a formation through which the hydrocarbon well extends by flowing the solvent mixture including the lactic acid through the hydrocarbon well and into the formation.

20 Claims, 6 Drawing Sheets

Related U.S. Application Data division of application No. 17/229,234, filed on Apr. 13, 2021, now Pat. No. 11,492,540.

(60) Provisional application No. 63/009,633, filed on Apr. 14, 2020.

(51) Int. Cl.
*E21B 43/26* (2006.01)
*E21B 43/28* (2006.01)

(56) References Cited

U.S. PATENT DOCUMENTS

| | | | |
|---|---|---|---|
| 4,239,630 A | 12/1980 | Atkinson | |
| 4,248,717 A | 2/1981 | Sharp et al. | |
| 4,601,836 A | 7/1986 | Jones | |
| 4,988,389 A | 1/1991 | Adamache et al. | |
| 2017/0335174 A1* | 11/2017 | Blattel | C09K 8/725 |

* cited by examiner

SOLVENT MIXTURES FOR DOWNHOLE ELEMENTAL SULFUR REMOVAL AND FORMATION STIMULATION

CROSS REFERENCE TO RELATED APPLICATIONS

This application is a divisional of U.S. patent application Ser. No. 17/936,282, entitled "Solvent Mixtures for Downhole Elemental Sulfur Removal and Formation Stimulation," filed Sep. 28, 2022, which is hereby incorporated by reference in its entirety, which is a division of U.S. patent application Ser. No. 17/229,234, entitled "Solvent Mixtures for Downhole Elemental Sulfur Removal and Formation Stimulation," filed Apr. 13, 2021, which is hereby incorporated by reference in its entirety, which claims the benefit of U.S. Provisional Application 63/009,663, entitled "Solvent Mixtures for Downhole Elemental Sulfur Removal and Formation Stimulation," filed Apr. 14, 2020, the disclosure of which is hereby incorporated by reference in its entirety.

FIELD OF THE INVENTION

The techniques described herein relate to the field of well completions and downhole operations. More particularly, the techniques described herein relate to solvent mixtures for removing elemental sulfur from well components and stimulating a formation through which the well extends.

BACKGROUND OF THE INVENTION

This section is intended to introduce various aspects of the art, which may be associated with embodiments of the present techniques. This discussion is believed to assist in providing a framework to facilitate a better understanding of particular aspects of the present techniques. Accordingly, it should be understood that this section should be read in this light, and not necessarily as admissions of prior art.

Elemental sulfur deposition in production wells and gathering facilities can be an issue for certain sour gas reservoirs. Elemental sulfur is soluble in sour gas, i.e., gas containing acid gases such as hydrogen sulfide ($H_2S$) and carbon dioxide ($CO_2$), and the solubility of the elemental sulfur increases with increasing temperature, pressure, $H_2S$ content, and $CO_2$ content. In the production of sour gas reservoirs containing dissolved elemental sulfur, problems have been encountered due to the deposition of the elemental sulfur downhole. As the gas from the reservoir is produced by the well, the temperature and pressure of the gas gradually decrease. This causes some amount of the elemental sulfur to drop out of the gas and deposit on the walls of the production tubing within the well. Such sulfur deposition can restrict the flow path of the gas through the tubing. In severe cases, the tubing may be entirely plugged by the sulfur deposits, causing the well to become non-operational.

Historically, diaryl disulfide (DADS)-based solvents have been utilized to dissolve elemental sulfur and remove the elemental sulfur from wellbore components. Such DADS-based solvents are effective at removing elemental sulfur and do not exhibit an extremely unpleasant odor. However, DADS-based solvents have become difficult to obtain and/or utilize.

Dimethyl disulfide (DMDS)-based solvents are also effective at dissolving elemental sulfur and removing the elemental sulfur from wellbore components. However, DMDS-based solvents are extremely malodorous. Even small releases of DMDS-based solvents may create large volumes of foul-smelling air. Thus, it may be impractical, or impermissible, to apply DMDS-based solvents in many situations.

Furthermore, for downhole applications, formation permeability should be taken into account when deciding how to mitigate sulfur deposition. Specifically, any solvent that is used for dissolving elemental sulfur within a well should not adversely affect the permeability of the producing formation, since that would compromise the productivity of the well. Therefore, there exists a need for improved solvent mixtures that may be used to dissolve elemental sulfur within a wellbore, while also maintaining or improving the permeability of the formation through which the wellbore extends.

SUMMARY OF THE INVENTION

An embodiment described herein provides a method for dissolving elemental sulfur within a hydrocarbon well and stimulating a formation through which the hydrocarbon well extends. The method includes providing a solvent mixture, wherein the solvent mixture includes an elemental sulfur solvent fraction including at least one elemental sulfur solvent, and an odorant fraction including at least one odorant. The at least one odorant includes at least weight percent (wt %) and at most 70 wt % of a lactate ester solvent. In addition, the elemental sulfur solvent fraction forms at least 20 wt % and at most 80 wt % of the solvent mixture, and the odorant fraction forms at least 20 wt % and at most 80 wt % of the solvent mixture. In various embodiments, the lactate ester solvent includes at least one of ethyl lactate or methyl lactate, and the elemental sulfur solvent fraction includes dimethyl disulfide (DMDS).

The method also includes injecting the solvent mixture into a hydrocarbon well such that the elemental sulfur solvent fraction of the solvent mixture dissolves elemental sulfur deposited on well components, and contacting the solvent mixture with water such that the lactate ester solvent within the odorant fraction reacts with the water to generate lactic acid. The method further includes stimulating a formation through which the hydrocarbon well extends by flowing the solvent mixture including the lactic acid through the hydrocarbon well and into the formation.

Providing the solvent mixture may include combining the elemental sulfur solvent fraction with the odorant fraction; wherein the elemental sulfur solvent fraction includes a solvent odor and a solvent sulfur solubility of at least 10 weight percent (wt %) at standard temperature and pressure (STP) (which is 60° F. at 14.696 pounds per square inch (psi) or 1 atmosphere pressure (absolute) (atm)), and the odorant fraction includes an odorant odor that differs from the solvent odor; and wherein the presence of the odorant fraction within the solvent mixture decreases at least one of an intensity or an offensiveness of a mixture odor of the solvent mixture relative to the solvent odor. Providing the solvent mixture may also include adding at least 5 wt % and at most 20 wt % water directly to the solvent mixture. Providing the solvent mixture may also include increasing a temperature of the solvent mixture to at least 95° F. (degree Fahrenheit) by, for example, flowing the solvent mixture through a hot oiler truck or a heat exchanger before injecting the solvent mixture into the hydrocarbon well. Further, providing the solvent mixture may include adding at least 5 wt % and at most 15 wt % of a catalyst, such as methyldiethanolamine (MDEA), to the odorant fraction, wherein the catalyst increases a reaction rate between the lactate ester solvent and the water.

Contacting the solvent mixture with the water may include allowing produced water flowing through the hydrocarbon well to react with the lactate ester solvent within the solvent mixture to generate the lactic acid. When water is added directly to the solvent mixture, contacting the solvent mixture with the water may also include allowing the water within the solvent mixture to react with the lactate ester solvent within the solvent mixture to generate the lactic acid.

Injecting the solvent mixture into the hydrocarbon well such that the elemental sulfur solvent fraction of the solvent mixture dissolves the elemental sulfur deposited on the well components may include flowing the solvent mixture through a production tubing of the hydrocarbon well such that elemental sulfur solvent fraction of the solvent mixture dissolves elemental sulfur deposited on a wall of the production tubing. The method may further include removing the elemental sulfur from the hydrocarbon well by flowing the solvent mixture out of the hydrocarbon well. This may be accomplished by collecting the solvent mixture within a separator located at a surface and/or flowing the solvent mixture into a sour water disposal well.

Another embodiment described herein provides a solvent mixture. The solvent mixture has a mixture odor and includes an elemental sulfur solvent fraction including at least one elemental sulfur solvent with a solvent odor and a solvent sulfur solubility of at least 10 wt % at STP, and an odorant fraction including at least one odorant with an odorant odor that differs from the solvent odor, wherein the at least one odorant includes at least 20 wt % and at most 70 wt % of a lactate ester solvent. The elemental sulfur solvent fraction forms at least 20 wt % and at most 80 wt % of the solvent mixture, and the odorant fraction forms at least 20 wt % and at most 80 wt % of the solvent mixture. The presence of the odorant fraction within the solvent mixture decreases at least one of an intensity or an offensiveness of the mixture odor relative to the solvent odor. In addition, the lactate ester solvent within the odorant fraction reacts with water to form lactic acid.

The lactate ester solvent may include at least one of ethyl lactate or methyl lactate. The elemental sulfur solvent fraction may include DMDS. For example, the DMDS may make up at least 20 wt % and at most 40 wt % of the elemental sulfur solvent fraction. The solvent mixture may further include at least 5 wt % and at most 20 wt % water. Moreover, the temperature of the solvent mixture may be at least 95° F.

The at least one odorant within the odorant fraction may also include at least 5 wt % and at most 15 wt % of a catalyst, such as MDEA, that increases a reaction rate between the lactate ester solvent and the water. A mixture sulfur solubility of the elemental sulfur within the solvent mixture may be at least 10% and at most 90% of the solvent sulfur solubility. In addition, the presence of the odorant fraction within the solvent mixture may decrease the intensity of the mixture odor, relative to the solvent odor, by at least 1 on an Odor Intensity Referencing Scale, and/or decrease the offensiveness of the mixture odor, relative to the solvent odor, by at least 1 on an Odor Offensiveness Referencing Scale.

The elemental sulfur solvent fraction may include at least one of DMDS, methanol, isopropanol, DEA, acetone, diaryl disulfide (DADS), carbon disulfide, toluene, or an organic elemental sulfur solvent. The odorant fraction may include at least one of a ketone, acetone, methyl ethyl ketone (MEK), an amine, monoethanolamine (MEA), diethanolamine (DEA), triethanolamine (TEA), methyldiethanolamine (MDEA), an ester, an aromatic compound, or a sulfurous compound. For example, the odorant fraction further may include at least one of at least 5 wt % and at most 15 wt % acetone and/or at least 10 wt % and at most 30 wt % MEK. As another example, the odorant fraction includes at least 3 wt % and at most 22 wt % of an amine, such as MEA, DEA, TEA, and/or MDEA. The odorant fraction may include one or more of MEA, DEA, TEA, and/or MDEA.

Another embodiment described herein provides a method for in situ lactic acid generation within a hydrocarbon well. The method includes providing a solvent mixture including water, an elemental sulfur solvent fraction including at least one elemental sulfur solvent, and an odorant fraction including at least one odorant, the at least one odorant including a lactate ester solvent. The method also includes injecting the solvent mixture into a hydrocarbon well such that the elemental sulfur solvent fraction of the solvent mixture dissolves elemental sulfur deposited on well components. The method further includes generating lactic acid within the hydrocarbon well by contacting the lactate ester solvent within the solvent mixture with at least one of the water within the solvent mixture or produced water flowing through the hydrocarbon well.

Providing the solvent mixture may include combining the water, the elemental sulfur solvent fraction, and the odorant fraction; wherein the elemental sulfur solvent fraction has a solvent odor, and the odorant fraction has an odorant odor that differs from the solvent odor; and wherein the presence of the odorant fraction within the solvent mixture decreases at least one of an intensity or an offensiveness of a mixture odor of the solvent mixture relative to the solvent odor. Providing the solvent mixture may also include increasing a temperature of the solvent mixture and/or adding a catalyst to the odorant fraction, wherein the catalyst increases a reaction rate between the lactate ester solvent and the water. Moreover, the method may further include stimulating a formation through which the hydrocarbon well extends by flowing the solvent mixture including the lactic acid through the hydrocarbon well and into the formation.

BRIEF DESCRIPTION OF THE DRAWINGS

The advantages of the present techniques may become apparent upon reviewing the following detailed description and drawings of non-limiting examples, in which.

Figure 1:
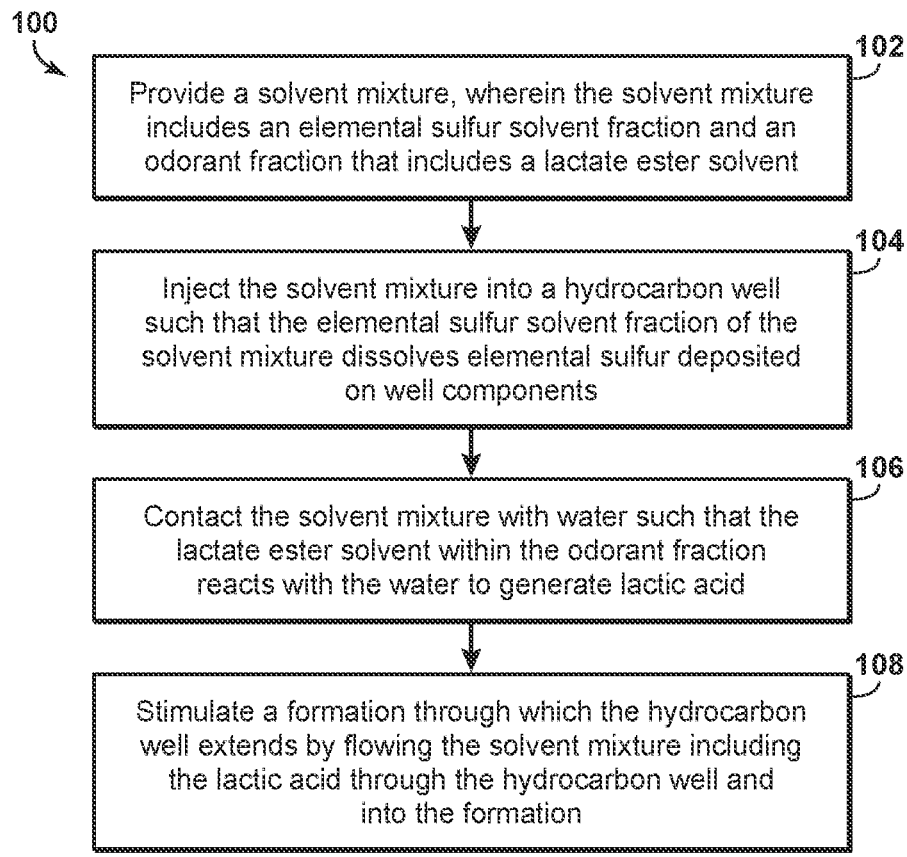
FIG. 1 is a process flow diagram of a method for utilizing a solvent mixture to dissolve elemental sulfur within a hydrocarbon well and stimulate a formation through which the hydrocarbon well extends.

It should be noted that the figures are merely examples of the present techniques, and no limitations on the scope of the present techniques are intended thereby.

DETAILED DESCRIPTION

In the following detailed description section, the specific examples of the present techniques are described in connection with preferred embodiments. However, to the extent that the following description is specific to a particular embodiment or a particular use of the present techniques, this is intended to be for example purposes only and simply provides a description of the embodiments. Accordingly, the techniques are not limited to the specific embodiments described below, but rather, include all alternatives, modifications, and equivalents falling within the true spirit and scope of the appended claims.

At the outset, and for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As used herein, the terms "a" and "an" mean one or more when applied to any embodiment described herein. The use of "a" and "an" does not limit the meaning to a single feature unless such a limit is specifically stated.

"Acid gas" refers to any gas that dissolves in water, producing an acidic solution. Non-limiting examples of acid gases include hydrogen sulfide ($H_2S$), carbon dioxide ($CO_2$), sulfur dioxide ($SO_2$), carbon disulfide ($CS_2$), carbonyl sulfide (COS), mercaptans, or mixtures thereof. Moreover, the term "sour natural gas stream," or simply "sour gas," refers to a natural gas stream that contains relatively high quantities of acid gas components.

The term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "including," may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

The phrase "at least one," in reference to a list of one or more entities, should be understood to mean at least one entity selected from any one or more of the entities in the list of entities, but not necessarily including at least one of each and every entity specifically listed within the list of entities, and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently, "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, the terms "example," exemplary," and "embodiment," when used with reference to one or more components, features, structures, or methods according to the present techniques, are intended to convey that the described component, feature, structure, or method is an illustrative, non-exclusive example of components, features, structures, or methods according to the present techniques. Thus, the described component, feature, structure or method is not intended to be limiting, required, or exclusive/exhaustive; and other components, features, structures, or methods, including structurally and/or functionally similar and/or equivalent components, features, structures, or methods, are also within the scope of the present techniques.

As used herein, the term "fluid" refers to gases, liquids, and combinations of gases and liquids, as well as to combinations of gases and solids, and combinations of liquids and solids.

"Formation" refers to a subsurface region including an aggregation of subsurface sedimentary, metamorphic and/or igneous matter, whether consolidated or unconsolidated, and other subsurface matter, whether in a solid, semi-solid, liquid and/or gaseous state, related to the geological development of the subsurface region. A formation can be a body of geologic strata of predominantly one type of rock or a combination of types of rock, or a fraction of strata having substantially common sets of characteristics. A formation can contain one or more hydrocarbon-bearing subterranean formations. Note that the terms "formation," "reservoir," and "interval" may be used interchangeably, but may generally be used to denote progressively smaller subsurface regions, zones, or volumes. More specifically, a "formation" may generally be the largest subsurface region, while a "reservoir" may generally be a hydrocarbon-bearing zone or interval within the geologic formation that includes a relatively high percentage of oil and gas.

The term "gas" is used interchangeably with "vapor," and is defined as a substance or mixture of substances in the gaseous state as distinguished from the liquid or solid state. Likewise, the term "liquid" means a substance or mixture of substances in the liquid state as distinguished from the gas or solid state.

A "hydrocarbon" is an organic compound that primarily includes the elements hydrogen and carbon, although nitrogen, sulfur, oxygen, metals, or any number of other elements may be present in small amounts. As used herein, the term "hydrocarbon" generally refers to components found in natural gas and oil. Moreover, the term "hydrocarbon" may refer to components found in raw natural gas, such as $CH_4$, $C_2H_6$, C3 isomers, C4 isomers, benzene, and the like.

"Lactate ester solvents" are a group of "green," i.e., environmentally friendly, solvents that are non-toxic and readily biodegradable. Examples of lactate ester solvents are ethyl lactate and methyl lactate, both of which belong to the lactate ester group of compounds. Ethyl lactate, also known as lactic acid ethyl ester, is a monobasic ester formed from lactic acid and ethanol. Similarly, methyl lactate, also known as lactic acid methyl ester, is a monobasic ester formed from lactic acid and methanol. Both ethyl lactate and methyl lactate react with water to form lactic acid (and ethanol or methanol, respectively).

As used herein, the term "permeability" refers to the capacity of a material to allow fluids to pass through it. Permeability may be measured using Darcy's Law: $Q=(k \Delta P A)/(\mu L)$, where Q=flow rate (cubic centimeter per second ($cm^3/s$)), $\Delta P$=pressure drop (atmosphere (atm)) across a cylinder having a length L (centimeter (cm)) and a cross-sectional area A (squared centimeter ($cm^2$)), $\mu$=fluid viscosity (centipoise (cp)), and k=permeability (Darcy). The customary unit of measurement for permeability is the millidarcy (mD). When the term "permeability" is used herein with reference to a formation, or an interval of a formation, it refers to the capacity of the formation to transmit fluids through the interconnected pore spaces of the rock.

As used herein, the term "solvent" refers to a fluid (typically in liquid phase) that preferentially absorbs one component over another, while the term "solvent mixture" refers to some combination of solvents that preferentially absorb one component over another. According to embodiments described herein, the term "solvent mixture" generally refers to a mixture of solvents that are capable of preferentially absorbing elemental sulfur.

As used herein, the term "stimulation" refers to the process of treating a hydrocarbon-bearing formation to increase the production rate of hydrocarbons from the formation. While many different techniques are used to stimulate a formation, the term "stimulation" is primarily used herein in reference to the process of "acid stimulation." Acid stimulation involves treating a formation with a fluid containing a reactive acid, which increases the permeability of the formation.

The term "substantially," when used in reference to a quantity or amount of a material, or a specific characteristic thereof, refers to an amount that is sufficient to provide an effect that the material or characteristic was intended to provide. The exact degree of deviation allowable may depend, in some cases, on the specific context.

As used herein, the term "subsurface" refers to a geologic strata occurring below the earth's surface, while the term "surface" refers to the uppermost land surface of a land well, or the mud line of an offshore well. Moreover, as used herein, "surface" and "subsurface" are relative terms. The fact that a particular piece of equipment is described as being on the surface does not necessarily mean it must be physically above the surface of the earth but, rather, describes only the relative placement of the surface and subsurface pieces of equipment. In that sense, the term "surface" may generally refer to any equipment that is located above the casing, production tubing, and other equipment that is located inside the wellbore. Moreover, according to embodiments described herein, the terms "downhole" and "subsurface" are sometimes used interchangeably. More specifically, the term "downhole" is used to refer to the inside of the wellbore.

The terms "well" and "wellbore" refer to holes drilled vertically, at least in part, and may also refer to holes drilled with deviated, highly deviated, and/or horizontal sections. The term also includes wellhead equipment, surface casing, intermediate casing, and the like, typically associated with oil and gas wells.

As used herein, a "well completion" is a group of equipment and operations that may be installed and performed to produce hydrocarbons from a subsurface reservoir. The well completion may include the casing, production tubing, completion fluid, gas lift valves, and other equipment used to prepare the well to produce hydrocarbons. Moreover, the term "well components" is used herein to refer generally to the well completion equipment.

Overview

The present techniques relate to solvent mixtures for downhole elemental sulfur removal and formation stimulation. More specifically, the present techniques relate to solvent mixtures that are capable of dissolving elemental sulfur that is deposited on well components, such as production tubing, within a hydrocarbon well, as well as stimulating a subsurface formation through which the hydrocarbon well extends. In contrast to typical solvents used for elemental sulfur removal, the solvent mixtures described herein are formulated to remove elemental sulfur from the well components without generating a significant volume of malodorous, or foul-smelling, gas. This is accomplished by utilizing the "white smell effect," which is described further herein.

According to embodiments described herein, stimulation of the formation is accomplished via the in situ generation of lactic acid from the solvent mixture. In various embodiments, the lactic acid is generated by the reaction of a lactate ester solvent, which is present within the solvent mixture, and water. In some embodiments, this reaction is aided by increasing the temperature of the solvent mixture and/or adding a catalyst to the solvent mixture, as described further herein.

Composition of the Solvent Mixture and the White Smell Effect

The solvent mixture described herein includes an elemental sulfur solvent fraction and an odorant fraction. The elemental sulfur solvent fraction includes an elemental sulfur solvent having and/or exhibiting a solvent odor. The elemental sulfur solvent fraction also has and/or exhibits a solvent sulfur solubility, which is the solubility of elemental sulfur within the elemental sulfur solvent. The odorant fraction includes at least one odorant having an odorant odor that differs from the solvent odor of the elemental sulfur solvent. The mixture odor differs from the solvent odor and also may differ from the odorant odor.

According to embodiments described herein, the odorant fraction, or presence of the odorant within the solvent mixture, improves the mixture odor, or a mixture odor perceived by an individual who smells the solvent mixture, when compared to the solvent odor, or a solvent odor perceived by an individual who smells the elemental sulfur solvent. As an example, the presence of the odorant fraction within the solvent mixture may decrease an intensity, or a perceived intensity, of the mixture odor relative to the solvent odor. As another example, the presence of the odorant fraction may decrease an offensiveness, or a perceived offensiveness, of the mixture odor relative to the solvent odor. This decrease in intensity and/or offensiveness of the mixture odor, when compared to the solvent odor, may be accomplished via a variety of distinct and/or cooperative mechanisms.

As an example, the addition of the odorant fraction to the elemental sulfur solvent fraction may cause the resulting solvent mixture to have a pleasant, or at least a more pleasant, mixture odor when compared to the solvent odor. Expressed in different terms, the addition of the odorant fraction to the elemental sulfur solvent fraction may cause the resulting solvent mixture to have a less offensive and/or less malodorous mixture odor when compared to the solvent odor of the elemental sulfur solvent by itself. As another example, the odorant fraction may be selected to have and/or to exhibit a number of distinct odors and/or to provide the number of distinct odors to the solvent mixture. Under these conditions, the addition of the odorant fraction to the elemental sulfur solvent fraction may cause the resulting mixture odor to include a variety, or a wide variety, of distinct odors, the combination of which may confuse and/or otherwise overwhelm olfactory organs of the individual who smells the solvent mixture, thereby causing the perceived intensity and/or the perceived offensiveness of the mixture odor to be less than the perceived intensity and/or the perceived offensiveness of the solvent odor. Such an effect may be referred to herein as a "white smell effect" and/or as a "white smell odor." Similar to white light and/or white noise, the white smell odor may be less distinctive, intense, and/or offensive to the user who smells the solvent mixture when compared to one or more of the individual odors that make up the white smell odor, and especially the solvent odor.

The intensity of the mixture odor and/or the decrease in the intensity of the mixture odor relative to the solvent odor may be measured and/or quantified in any suitable manner. For example, the presence of the odorant fraction may decrease a perceived intensity of the mixture odor, relative to the solvent odor, by at least 1, by at least 2, by at least 3, by at least 4, and/or by at least 5 on an Odor Intensity Referencing Scale. Examples of Odor Intensity Referencing Scales are defined by ASTM E544-99.

The offensiveness of the mixture odor and/or the decrease in the offensiveness of the mixture odor relative to the solvent odor may be measured and/or quantified in any suitable manner. As an example, the presence of the odorant fraction may decrease a perceived offensiveness of the mixture odor, relative to the solvent odor, by at least 1, by at least 2, by at least 3, by at least 4, and/or by at least 5 on an Odor Offensiveness Referencing Scale. Such Odor Offensiveness Referencing Scales are generally subjective in nature and typically utilize panelists to rank odors on a scale of 0 to 10, with 0 indicating that the odor is not offensive and 10 indicating that the odor is very offensive.

The elemental sulfur solvent fraction may have at least a threshold, or minimum, solvent sulfur solubility. Examples of the threshold solvent sulfur solubility include solubilities of 10 weight percent (wt %), 15 wt %, 20 wt %, 30 wt %, 40 wt %, 50 wt %, 60 wt %, 70 wt %, 80 wt %, 90 wt %, 100 wt %, 110 wt %, 120 wt %, 130 wt %, 140 wt %, and/or 150 wt %. The threshold solvent sulfur solubility may be measured, established, and/or determined at standard temperature and pressure (STP) (which is 60° F. at 14.696 pounds per square inch (psi) or 1 atmosphere pressure (absolute) (atm)). Further, it is possible for certain solvents to dissolve an amount of sulfur greater than the solvent weight. In particular, Sulfur may be dissolved as an S8 molecule, which has a molecular weight of about 256 daltons. Because the molecular weight of the solvents in the present techniques are substantially less than that, a one to one molar solubility results in a greater than (>) 100% weight solubility. As a result, the weight percentages of some solubilities may exceed 100% because some solvents, such as DMDS, may dissolve more sulfur than its actual weight at elevated temperatures, which may include temperatures greater than or equal to 140° F.

The solvent mixture may include any suitable amount, fraction, and/or percentage of the elemental sulfur solvent. As examples, the elemental sulfur solvent fraction may form, define, be made of, and/or constitute at least 20 wt %, at least 30 wt %, at least 40 wt %, at least 50 wt %, at least 60 wt %, and/or at least 70 wt % of the solvent mixture. Additionally or alternatively, the elemental sulfur solvent fraction may form, define, be made of, and/or constitute at most 80 wt %, at most 70 wt %, at most 60 wt %, at most 50 wt %, at most 40 wt %, and/or at most 30 wt % of the solvent mixture.

In some embodiments, the elemental sulfur solvent fraction is a single-component elemental sulfur solvent fraction that includes, consists of, or consists essentially of a single elemental sulfur solvent. In other embodiments, the elemental sulfur solvent fraction is a multi-component elemental sulfur solvent fraction that includes, consists of, or consists essentially of a number of elemental sulfur solvents, such as at least 2, at least 3, or at least 4 different elemental sulfur solvents.

The elemental sulfur solvent fraction may include any suitable elemental sulfur solvent and/or solvents. For example, the elemental sulfur solvent fraction may include, consist of, or consist essentially of dimethyl disulfide (DMDS), methanol, isopropanol, diethanolamine (DEA), acetone, diaryl disulfide (DADS), carbon disulfide, toluene, and/or an organic elemental sulfur solvent.

As described herein, DMDS is an effective elemental sulfur solvent. However, the solvent odor of DMDS often precludes practical utilization of pure, or at least substantially pure, DMDS as an elemental sulfur solvent. However, according to embodiments described herein, the addition of the odorant fraction to a solvent mixture that includes DMDS generates a mixture odor that permits the solvent mixture to be utilized as an elemental sulfur solvent. DMDS also has other properties that are improved by the addition of the odorant fraction to generate the solvent mixture. For example, the solvent sulfur solubility of DMDS may be up to 115 wt %, which may exceed 100% at elevated temperatures (e.g., greater than or equal to 140° F.). This may be a result of the S8 molecules being heavier than the solvent molecules. However, when high concentrations of elemental sulfur are dissolved in DMDS, the resultant loaded solvent mixture, or sulfur-solvent mixture, may have a high viscosity and/or may clog filters. As described further herein, the addition of the odorant fraction to the solvent mixture decreases the viscosity of the solvent mixture and decreases the solvent sulfur solubility of the solvent mixture that includes DMDS relative to pure DMDS, thereby decreasing the potential for complications with filtering and/or conveyance of the loaded solvent mixture.

In some embodiments, the elemental sulfur solvent fraction includes a mixture of elemental sulfur solvents. One such mixture is marked under the trade name Brenntag 9597™ and includes in a range between 30 wt % and 60 wt % DEA, in a range between 30 wt % and 60 wt % methanol, in a range between 10 wt % and 30 wt % acetone, and in a arrange between 5 wt % and 10 wt % isopropanol. These ranges may be adjusted to speed up the uptake of elemental surface given the presence of amines and DMDS or decrease the viscosity or reduce the odor of the spent solvent with ketones. Further, the formulation may be adjusted to compensate for other factors. For example, high CO2 and even H2S partial pressure may lessen the effectiveness of the formulation for sulfur uptake.

In some embodiments, the elemental sulfur solvent fraction (and/or the solvent mixture that includes the elemental sulfur solvent fraction) has, or is selected to have, specified flammability properties. As an example, the elemental sulfur solvent fraction (and/or the solvent mixture that includes the elemental sulfur solvent fraction) may be inflammable, or at least substantially inflammable. As another example, the elemental sulfur solvent fraction (and/or the solvent mixture that includes the elemental sulfur solvent fraction) may have at least a threshold lower flammability limit in air. Examples of the threshold lower flammability limit include thresholds of 10 volume percent (vol %), 20 vol %, 30 vol %, 40 vol %, 50 vol %, 60 vol %, 70 vol %, 80 vol %, and/or 90 vol %.

In some embodiments, the elemental sulfur solvent fraction (and/or the solvent mixture that includes the elemental sulfur solvent fraction) has less than a threshold viscosity. Examples of the threshold viscosity include viscosities of 2 centipoise (cP), 4 cP, 6 cP, 8 cP, 10 cP, 15 cP, and/or 20 cP.

The solvent mixture may include any suitable amount, fraction and/or percentage of the odorant fraction. As examples, the solvent mixture may include at least 20 wt %, at least 30 wt %, at least 40 wt %, at least 50 wt %, at least 60 wt %, and/or at least 70 wt % of the odorant fraction. Additionally or alternatively, the solvent mixture may include at most 80 wt %, at most 70 wt %, at most 60 wt %, at most 50 wt %, at most 40 wt %, and/or at most 30 wt % of the odorant fraction.

In various embodiments, the odorant fraction is a multi-component odorant fraction that includes, consists of, or consists essentially of a number of odorants, such as at least 2, at least 3, or at least 4 different odorants. According to embodiments described herein, the odorant fraction includes a lactate ester solvent, such as ethyl lactate or methyl lactate. For example, the odorant fraction may include at least 20 wt %, at least 22 wt %, at least 24 wt %, at least 26 wt %, at least 28 wt %, at least 30 wt %, at least 32 wt %, at least 34 wt %, at least 36 wt %, at least 38 wt %, at least 40 wt %, at least 42 wt %, at least 44 wt %, at least 46 wt %, at least 48 wt %, or at least 50 wt % of a lactate ester solvent. Additionally or alternatively, the odorant fraction may include at most 70 wt %, at most 68 wt %, at most 66 wt %, at most 64 wt %, at most 62 wt %, at most 60 wt %, at most 58 wt %, at most 56 wt %, at most 54 wt %, at most 52 wt %, and/or at most 50 wt % of a lactate ester solvent. The lactate ester solvent is used to generate lactic acid via chemical reaction with water, as described further herein. Moreover, the lactate ester solvent contributes a fruity or lemony scent to the mixture odor, and increases, or improves, the compatibility of the solvent mixture with ethylenepropylene diene monomer (EPDM) rubber, which may be utilized in the seals of a hydrocarbon well that utilizes the solvent mixture. Stated another way, the lactate ester solvent may decrease the potential for damage to the EDPM rubber due to contact with the solvent mixture.

In various embodiments, the odorant fraction includes a catalyst, such as methyldiethanolamine (MDEA), to aid the reaction between the lactate ester solvent and water. For example, the odorant fraction may include at least 5 wt %, at least 6 wt %, at least 7 wt %, at least 8 wt %, at least 9 wt %, at least 10 wt %, at most 15 wt %, at most 14 wt %, at most 13 wt %, at most 12 wt %, and/or at most 11 wt % MDEA.

The odorant fraction may also include any other suitable odorant and/or odorants. For example, the odorant fraction may also include a ketone, acetone, methyl ethyl ketone (MEK), an amine, monoethanolamine (MEA), diethanolamine (DEA), triethanolamine (TEA), an ester, an aromatic compound, and/or a sulfurous compound. Ketones, when utilized, may contribute a ketone, or butterscotch, scent to the mixture odor.

In various embodiments, the odorant fraction is miscible, or at least substantially miscible, with the elemental sulfur solvent fraction. In addition, the odorant fraction may be unreactive, or at least substantially unreactive, with and/or within the elemental sulfur solvent fraction. Furthermore, the elemental sulfur solvent fraction may be non-toxic, or at least substantially non-toxic.

In a specific embodiment, the elemental sulfur solvent fraction may include, consist of, or consist essentially of DMDS. In this embodiment, as well as in any of the other embodiments of solvent mixtures that are disclosed herein, the elemental sulfur solvent fraction may include at least 20 wt % DMDS, at least 22 wt % DMDS, at least 24 wt % DMDS, at least 26 wt % DMDS, at least 28 wt % DMDS, and/or at least 30 wt % DMDS. Additionally or alternatively, the elemental sulfur solvent fraction may include at most 40 wt % DMDS, at most 38 wt % DMDS, at most 36 wt % DMDS, at most 34 wt % DMDS, at most 32 wt % DMDS, and/or at most 30 wt % DMDS.

In this embodiment, as well as in any of the other embodiments of solvent mixtures that are disclosed herein, the odorant fraction may include, consist of, or consist essentially of acetone, MEK, and ethyl lactate. The odorant fraction may include at least 5 wt %, at least 6 wt %, at least 7 wt %, at least 8 wt %, at least 9 wt %, and/or at least 10 wt % acetone. Additionally or alternatively, the odorant fraction may include at most 15 wt %, at most 14 wt %, at most 13 wt %, at most 12 wt %, at most 11 wt %, and/or at most 10 wt % acetone. In addition to contributing the ketone, or butterscotch, odor to the mixture odor, the acetone may function as a wetting agent to improve sulfur uptake, or a rate of sulfur uptake, into the solvent mixture. The acetone additionally or alternatively may reduce the viscosity of the solvent mixture when compared to the viscosity of DMDS, especially after dissolution of elemental sulfur within the solvent mixture. The acetone additionally or alternatively may increase, or improve, a compatibility of the solvent mixture with EPDM rubber.

In this embodiment, as well as in the other embodiments of solvent mixtures that are disclosed herein, the odorant fraction may include at least 10 wt %, at least 12 wt %, at least 14 wt %, at least 16 wt %, at least 18 wt %, and/or at least 20 wt % MEK. Additionally or alternatively, the odorant fraction may include at most 30 wt %, at most 28 wt %, at most 26 wt %, at most 24 wt %, at most 22 wt %, and/or at most 20 wt % MEK. Similar to acetone, the MEK may contribute the ketone, or butterscotch, odor to the mixture odor, may function as a wetting agent to improve sulfur uptake, or a rate of sulfur uptake, into the solvent mixture, may reduce the viscosity of the solvent mixture when compared to the viscosity of DMDS, especially after dissolution of elemental sulfur within the solvent mixture, and/or may increase, or improve, the compatibility of the solvent mixture with EPDM rubber.

In this embodiment, as well as in the other embodiments of solvent mixtures that are disclosed herein, the odorant fraction may include at least 20 wt %, at least 22 wt %, at least 24 wt %, at least 26 wt %, at least 28 wt %, at least 30 wt %, at least 32 wt %, at least 34 wt %, at least 36 wt %, at least 38 wt %, at least 40 wt %, at least 42 wt %, at least 44 wt %, at least 46 wt %, at least 48 wt %, or at least 50 wt % ethyl lactate. Additionally or alternatively, the odorant fraction may include at most 70 wt %, at most 68 wt %, at most 66 wt %, at most 64 wt %, at most 62 wt %, at most 60 wt %, at most 58 wt %, at most 56 wt %, at most 54 wt %, at most 52 wt %, and/or at most 50 wt 20% ethyl lactate.

In addition to the above, the odorant fraction in this embodiment, as well as in the other embodiments of solvent mixtures that are disclosed herein, also may include an amine. The odorant fraction may include at least 3 wt %, at least 4 wt %, at least 5 wt %, at least 6 wt %, at least 7 wt %, at least 8 wt %, at least 9 wt %, at least 10 wt %, at least 11 wt %, and/or at least 12 wt % of the amine. Additionally or alternatively, the odorant fraction may include at most 22 wt %, at most 21 wt %, at most 20 wt %, at most 19 wt %, at most 18 wt %, at most 17 wt %, at most 16 wt %, at most 15 wt %, at most 14 wt %, at most 13 wt %, and/or at most 12 wt % of the amine. The DMDS may outgas hydrogen sulfide, and the amine may sequester the H2S within the solvent mixture. When the solvent mixture includes the amine, ketones, such as acetone and/or MEK, may be included in the solvent mixture to mask a smell of the amine.

In a more specific embodiment, as well as in the other embodiments of solvent mixtures that are disclosed herein, the amine may include, consist of, or consist essentially of MEA and/or DEA. In this more specific embodiment, the odorant fraction may include at least 0.1 wt %, at least 0.2 wt %, at least 0.3 wt %, and/or at least 0.4 wt % MEA. Additionally or alternatively, the odorant fraction may include at most 0.1 wt %, at most 0.2 wt %, at most 0.3 wt %, and/or at most 0.4 wt % MEA. The MEA may increase a rate of sulfur uptake within the solvent mixture by serving as a catalyst for the DMDS, may provide corrosion protection for metals, such as carbon steel, that contact the solvent mixture, and/or may improve, or increase, the compatibility of the solvent mixture with EPDM rubber.

In this more specific embodiment, as well as in the other embodiments of solvent mixtures that are disclosed herein, the odorant fraction also may include at least 0.1 wt %, at least 0.2 wt %, at least 0.3 wt %, at least 0.4 wt %, at least 0.5 wt % and/or at least 0.6 wt % DEA. Additionally or alternatively, the odorant fraction may include at most 0.6 wt %, at most 0.5 wt %, at most 0.4 wt %, at most 0.3 wt %, at most 0.2 wt % and/or at most 0.1 wt % DEA. The DEA may increase a selectivity of the solvent mixture to dissolve and/or retain elemental sulfur and/or hydrogen sulfide, may provide corrosion protection for metals, such as carbon steel, that contact the solvent mixture, may improve, or increase, the compatibility of the solvent mixture with EPDM rubber, and/or may decrease hydrogen sulfide generation and/or outgassing from the solvent mixture, especially at lower temperatures.

In another more specific embodiment, as well as in the other embodiments of solvent mixtures that are disclosed herein, may include an amine that may include, consist of, or consist essentially of TEA. In this more specific embodiment, as well as in the other embodiments of solvent mixtures that are disclosed herein, the odorant fraction may include at least 5 wt %, at least 6 wt %, at least 7 wt %, at least 8 wt %, at least 9 wt %, and/or at least 10 wt % TEA. Additionally or alternatively, the odorant fraction may include at most 5 wt %, at most 6 wt %, at most 7 wt %, at most 8 wt %, at most 9 wt %, and/or at most 10 wt % TEA.

As described herein, the presence of the odorant fraction within the solvent mixture may decrease a mixture sulfur solubility of elemental sulfur within the solvent mixture as compared to the solvent sulfur solubility. Stated another way, the mixture sulfur solubility may be less than the solvent sulfur solubility. In various embodiments, this decrease in sulfur solubility is desirable because it decreases a viscosity of the solvent mixture when sulfur is dissolved in the solvent mixture, and/or decreases a potential for clogging of filters by the solvent mixture when sulfur is dissolved within the solvent mixture.

The mixture sulfur solubility may be any suitable fraction, or percentage, of the solvent sulfur solubility. For example, the mixture sulfur solubility may be at least 10%, at least 20%, at least 30%, at least 40%, at least 50%, at least 60%, at least 70%, and/or at least 80% of the solvent sulfur solubility. Additionally or alternatively, the mixture sulfur solubility may be at most 90%, at most 80%, at most 70%, at most 60%, at most 50%, at most 40%, and/or at most 30% of the solvent sulfur solubility.

In some embodiments, the odorant fraction may be selected such that the solvent mixture has a target, or desired, mixture sulfur solubility. Examples of the target mixture sulfur solubility include solubilities of at least 10 wt %, at least 20 wt %, at least 30 wt %, at least 40 wt %, at least 50 wt %, at least 60 wt %, at least 70 wt %, and/or at least 80 wt %. Additionally or alternatively, the target mixture sulfur solubility may be at most 90 wt %, at most 80 wt %, at most 70 wt %, at most 60 wt %, at most 50 wt %, at most 40 wt %, and/or at most 30 wt %.

In some embodiments, the elemental sulfur solvent fraction and/or the odorant fraction is selected such that the solvent mixture is compatible with, does not degrade, and/or does not swell elastomeric seals, such as EPDM seals. Additionally or alternatively, the elemental sulfur solvent fraction and/or the odorant fraction may be selected such that the solvent mixture is not corrosive to metals, such as carbon steel. Additionally or alternatively, the elemental sulfur solvent fraction and/or the odorant fraction may be selected such that the solvent mixture is not flammable or has greater than a threshold lower flammability limit, examples of which are described herein.

As described further herein, the lactate ester solvent within the solvent mixture reacts with water to form lactic acid, which may be used for formation stimulation. Therefore, according to embodiments described herein, the elemental sulfur solvent fraction and/or the odorant fraction are selected such that the solvent mixture is compatible with water and/or dissolves elemental sulfur in the presence of water. In various embodiments, at least some amount of water is added directly to the solvent mixture or is part of the solvent mixture. For example, the solvent mixture may include at least 5 wt %, at least 6 wt %, at least 7 wt %, at least 8 wt %, at least 9 wt %, at least 10 wt %, at most 20 wt % water, at most 19 wt % water, at most 18 wt %, at most 17 wt %, at most 16 wt %, and/or at most 15 wt % water. Moreover, the solvent mixture may be formulated to handle significant amounts of additional water, to dissolve elemental sulfur in the presence of, or while in fluid contact with, water, to be stable in the presence of, or while in fluid contact with, water, and/or to retain dissolved elemental sulfur in the presence of, or while in fluid contact with, water. This may include retaining the dissolved elemental sulfur while in the presence of, while in fluid contact with, and/or while mixed with water for at least a threshold water contact time. Examples of the threshold water contact time include at least 1 hour, at least 4 hours, at least 8 hours, at least 12 hours, at least 16 hours, at least 20 hours, at least 24 hours, at least 36 hours, and/or at least 48 hours. The threshold water contact time may be at temperatures above 50° C. (degree Celsius). As may be appreciated, water adds weight and volume to the mixture, which may be utilized to send the concentrated solution into the wellbore and use water within the wellbore to adjust the solvent mixture to the desired concentration.

In a specific embodiment, the elemental sulfur solvent fraction includes around 30 wt % DMDS, which is used to remove elemental sulfur from downhole well components, such as the production tubing. In this embodiment, the odorant fraction includes around 10 wt % MDEA, which is used as a catalyst to speed up the reaction of DMDS and elemental sulfur, as well as the reaction of ethyl lactate and water. The MDEA may also act as a corrosion inhibitor and increase the capability of DMDS with EPDM seals for continuous injection. In this embodiment, the odorant fraction also around 10 wt % di-isobutyl ketone, which is used as a wetting agent to create a better contact angle between the DMDS and the elemental sulfur for uptake purposes. The di-isobutyl ketone also helps to decrease the odor of the DMDS via the white smell effect, reduces the viscosity of the DMDS after sulfur uptake, and increases the compatibility of DMDS with EPDM seals for continuous injections. The di-isobutyl ketone may also be replaced with around 5 wt % MEK and around 5 wt % acetone for a less expensive alternative. In addition, in this embodiment, the odorant fraction includes around 30 wt % ethyl lactate, which is used for in situ generation of lactic acid according to embodiments described herein. The ethyl lactate also helps to decrease the odor of the DMDS via the white smell effect and increases the compatibility of DMDS with EPDM seals for continuous injections. In addition, in this embodiment, the solvent mixture includes around 20 wt % water. This embodiment of the solvent mixture will not only effectively dissolve elemental sulfur, but will also generate lactic acid via the reaction of ethyl lactate and water, as described further herein.

It is to be understood that the solvent mixture is not limited to the specific embodiments described herein but, rather, may include any suitable portions, fractions, and/or percentages of the elemental sulfur solvent fraction and the odorant fraction. Moreover, the elemental sulfur solvent fraction may include any suitable elemental sulfur solvent (s), and the odorant fraction may include any suitable odorant(s) in addition to the lactate ester solvent(s).

In various embodiments, the solvent mixture is formed by combining the elemental sulfur solvent fraction and the odorant fraction in any suitable manner. For example, the elemental sulfur solvent fraction and the odorant fraction may be stirred together or mixed within a mixing vessel to form the solvent mixture. In embodiments in which water is also included within the solvent mixture, the water may be combined with the elemental sulfur solvent fraction and the odorant fraction in the same, or a similar, way.

Downhole Elemental Sulfur Removal and Formation Stimulation Using the Solvent Mixture The solvent mixture described herein may be used to remove elemental sulfur from many different types of hydrocarbon conveyance systems, such as hydrocarbon wells, hydrocarbon production facilities, and/or hydrocarbon conveyance conduits.

However, embodiments described herein primarily relate to the downhole application of the solvent mixture. Specifically, embodiments described herein relate to using the solvent mixture to remove elemental sulfur from downhole well components, such as the production tubing. Embodiments described herein also relate to generating lactic acid from the solvent mixture, and using the lactic acid to stimulate a hydrocarbon-bearing formation proximate to the well.

The solvent mixture may be injected into the well in any suitable manner. In one embodiment, the solvent mixture may be heated prior to injection. For example, in some embodiments, the solvent mixture is first pumped through a hot oiler truck or a heat exchanger, which increases the temperature of the solvent mixture to at least 95° F., at least 100° F., at least 105° F., at least 110° F., or at least 120° F., depending on the details of the specific implementation. The heated solvent mixture may then be bullheaded or pumped from the hot oiler truck or heat exchanger down the wellbore via any number of existing valves and/or flanges already assigned to the well manifold.

Once the solvent mixture has traveled down the wellbore, the elemental sulfur solvent fraction within the solvent mixture dissolves elemental sulfur deposits on the well components, creating a loaded solvent mixture, or a sulfur-solvent mixture, that includes both the solvent mixture and at least a portion of the elemental sulfur dissolved, suspended, or retained therein.

As described herein, the presence of the odorant fraction within the solvent mixture reduces the intensity and/or the offensiveness of the mixture odor via the white smell effect. Furthermore, according to embodiments described herein, the lactate ester solvent within the odorant fraction provides for in situ generation of lactic acid within the well. For example, if the lactate ester solvent is ethyl lactate, it will react with water to form lactic acid and ethanol. Similarly, if the lactate ester solvent is methyl lactate, it will react with water to form lactic acid and methanol. In various embodiments, increasing the temperature of the solvent mixture before pumping the solvent mixture into the well aids in the hydrolysis of the lactate ester solvent. Moreover, in embodiments in which a catalyst, such as MDEA, is included in the odorant fraction, the catalyst will also increase the hydrolysis reaction rate.

In various embodiments, the resulting lactic acid will acidify the carbonate materials in the near-wellbore region of the formation. Such stimulation will increase the permeability of the formation, thus increasing the production rate of hydrocarbon fluids from the formation.

After the elemental sulfur removal and formation stimulation processes are complete, the resulting loaded solvent mixture may be pumped back to the surface, where it may be collected within a separator or sent into a sour water disposal well. In some embodiments, the solvent mixture may circulate all the way through the well completion and back to the surface relatively quickly. For example, the total circulation time may be less than 0.5 hour, less than 1 hour, less than 1.5 hours, less than 2 hours, less than 2.5 hours, or less than 3 hours, depending on the details of the specific implementation. This short circulation time, in combination with the relatively high temperature of the solvent mixture, helps to ensure that the solvent mixture does not drop out solubilized sulfur elsewhere in the formation or the well. In other words, the mixture sulfur solubility remains high enough to retain the elemental sulfur within the solution.

As described herein, some amount of water may be included within the solvent mixture. For example, the solvent mixture may include at least 5 wt %, at least 6 wt %, at least 7 wt %, at least 8 wt %, at least 9 wt %, at least 10 wt %, at most 20 wt % water, at most 19 wt % water, at most 18 wt %, at most 17 wt %, at most 16 wt %, and/or at most 15 wt % water. This may be particularly useful when the solvent mixture is being bullheaded into a shut-in well. In that case, the water within the solvent mixture will allow for the immediate generation of lactic acid. Then, when the well is put into production, the amount of water within the well will naturally increase, thus increasing the rate of acid generation.

In some embodiments, it may be desirable to improve, or decrease the intensity of, the loaded solvent mixture odor, while maintaining a sulfur solubility of the loaded solvent mixture and/or while retaining the elemental sulfur dissolved, suspended, and/or retained within the loaded solvent mixture. This may be accomplished by, for example, adding additional lactate ester solvent, such as ethyl lactate, to the loaded solvent mixture such that the lactate ester solvent defines an additional at least 1 wt %, at least 2 wt %, at least 3 wt %, at least 4 wt %, at least 5 wt %, at least 6 wt %, at most 10 wt %, at most 9 wt %, at most 8 wt %, at most 7 wt %, at most 6 wt %, and/or at most 5 wt % of the loaded solvent mixture.

The solvent mixture described herein provides unexpected results in terms of downhole elemental sulfur removal and formation stimulation. In particular, water is generally expected to decrease a solvent's sulfur solubility, which in turn decreases the solvent's uptake of elemental sulfur. However, because the solvent mixture described herein utilizes the hydrolysis reaction between lactate ester solvents and water to generate lactic acid, increasing quantities of water actually improve the performance of the solvent mixture. In other words, the solvent mixture described herein effectively utilizes the water within the well to generate lactic acid for formation stimulation. As a result, the solvent mixture serves a dual purpose by both removing elemental sulfur from downhole well components and stimulating a formation through which the well extends. Moreover, the lactate ester solvent provides an additional benefit by helping to reduce the intensity and/or the offensiveness of the mixture odor, making the solvent mixture a more useful and attractive solvent for elemental sulfur removal than typical elemental sulfur solvents.

Methods for Utilizing a Solvent Mixture to Dissolve Elemental Sulfur Within a Hydrocarbon Well and Stimulate a Formation Through Which the Hydrocarbon Well Extends FIG. 1 is a process flow diagram of a method 100 for utilizing a solvent mixture to dissolve elemental sulfur within a hydrocarbon well and stimulate a formation through which the hydrocarbon well extends. The method 100 begins at block 102, at which a solvent mixture including an elemental sulfur solvent fraction and an odorant fraction that includes a lactate ester solvent, such as ethyl lactate or methyl lactate, is provided. The elemental sulfur solvent fraction includes at least one elemental sulfur solvent, such as dimethyl disulfide (DMDS), and the odorant fraction includes at least one odorant, wherein the at least one odorant includes at least 20 wt % and at most 70 wt % of the lactate ester solvent. In addition, the elemental sulfur solvent fraction forms at least 20 wt % and at most 80 wt % of the solvent mixture, and the odorant fraction forms at least 20 wt % and at most 80 wt % of the solvent mixture.

In various embodiments, providing the solvent mixture at block 102 includes combining the elemental sulfur solvent fraction with the odorant fraction. The elemental sulfur solvent fraction includes a solvent odor and a solvent sulfur solubility of at least 10 wt % at STP, and the odorant fraction includes an odorant odor that differs from the solvent odor. Moreover, the presence of the odorant fraction within the solvent mixture decreases at least one of an intensity or an offensiveness of a mixture odor of the solvent mixture relative to the solvent odor.

In various embodiments, providing the solvent mixture at block 102 includes adding at least 5 wt % and at most 20 wt % water directly to the solvent mixture. In addition, in some embodiments, providing the solvent mixture includes increasing the temperature of the solvent mixture to at least 95° F. This may be accomplished by, for example, flowing the solvent mixture through a hot oiler truck or a heat exchanger before injecting the solvent mixture into the hydrocarbon well. Furthermore, providing the solvent mixture may include adding at least 5 wt % and at most 15 wt % of a catalyst, such as methyldiethanolamine (MDEA), to the odorant fraction of the solvent mixture, wherein the catalyst increases a reaction rate between the lactate ester solvent and the water.

In some embodiments, the elemental sulfur solvent fraction may include any combination of, for example, DMDS, methanol, isopropanol, diethanolamine (DEA), acetone, diaryl disulfide (DADS), carbon disulfide, toluene, and an organic elemental sulfur solvent. For example, the elemental sulfur solvent fraction may include at least 20 wt % and at most 40 wt % DMDS. In addition to the lactate ester solvent, the odorant fraction may include any combination of a ketone, acetone, methyl ethyl ketone (MEK), an amine, monoethanolamine (MEA), DEA, triethanolamine (TEA), MDEA, an ester, an aromatic compound, or a sulfurous compound. For example, the odorant fraction may include at least 5 wt % and at most 15 wt % acetone and/or at least 10 wt % and at most 30 wt % MEK. As another example, the odorant fraction may include at least 3 wt % and at most 22 wt % of an amine, such as MEA, DEA, TEA, and/or MDEA. This may include only one of the amines. For example, if the operation is in a high CO2 partial pressure environment or H2S, using a tertiary amine, such as MDEA may be a preferred option for the application. MEA, and DEA are not likely to perform as effectively.

In various embodiments, the mixture sulfur solubility of the elemental sulfur within the solvent mixture is at least 10% and at most 90% of the solvent sulfur solubility. Further, in various embodiments, the presence of the odorant fraction within the solvent mixture decreases the intensity of the mixture odor, relative to the solvent odor, by at least 1 on an Odor Intensity Referencing Scale, and/or decreases the offensiveness of the mixture odor, relative to the solvent odor, by at least 1 on an Odor Offensiveness Referencing Scale.

At block 104, the solvent mixture is injected into a hydrocarbon well such that the elemental sulfur solvent fraction of the solvent mixture dissolves elemental sulfur deposited on well components. In some embodiments, this includes flowing the solvent mixture through a production tubing of the hydrocarbon well such that the elemental sulfur solvent fraction of the solvent mixture dissolves elemental sulfur deposited on a wall of the production tubing.

At block 106, the solvent mixture is contacted with water such that the lactate ester solvent within the odorant fraction reacts with the water to generate lactic acid. This may include allowing produced water flowing through the hydrocarbon well to react with the lactate ester solvent within the solvent mixture to generate the lactic acid. In addition, in embodiments in which water is added directly to the solvent mixture, this may include allowing the water within the solvent mixture to react with the lactate ester solvent within the solvent mixture to generate the lactic acid.

At block 108, a formation through which the hydrocarbon well extends is stimulated by flowing the solvent mixture including the lactic acid through the hydrocarbon well and into the formation. In various embodiments, the lactic acid acidifies carbonate materials within the formation, thus increasing the permeability of the formation. This, in turn, increases the production rate of hydrocarbon fluids from the formation.

The process flow diagram of FIG. 1 is not intended to indicate that the steps of the method 100 are to be executed in any particular order, or that all of the steps of the method 100 are to be included in every case. Further, any number of additional steps not shown in FIG. 1 may be included within the method 100, depending on the details of the specific implementation. For example, in some embodiments, the method 100 also includes removing the elemental sulfur from the hydrocarbon well by flowing the solvent mixture out of the hydrocarbon well. This may include, for example, collecting the solvent mixture within a separator located at the surface and/or flowing the solvent mixture into a sour water disposal well. According to embodiments described herein, the solvent mixture with the entrained elemental sulfur may be referred to as a loaded solvent mixture. In some embodiments, the loaded solvent mixture may then be treated to regenerate the solvent mixture for reuse within the hydrocarbon well.

Figure 2:
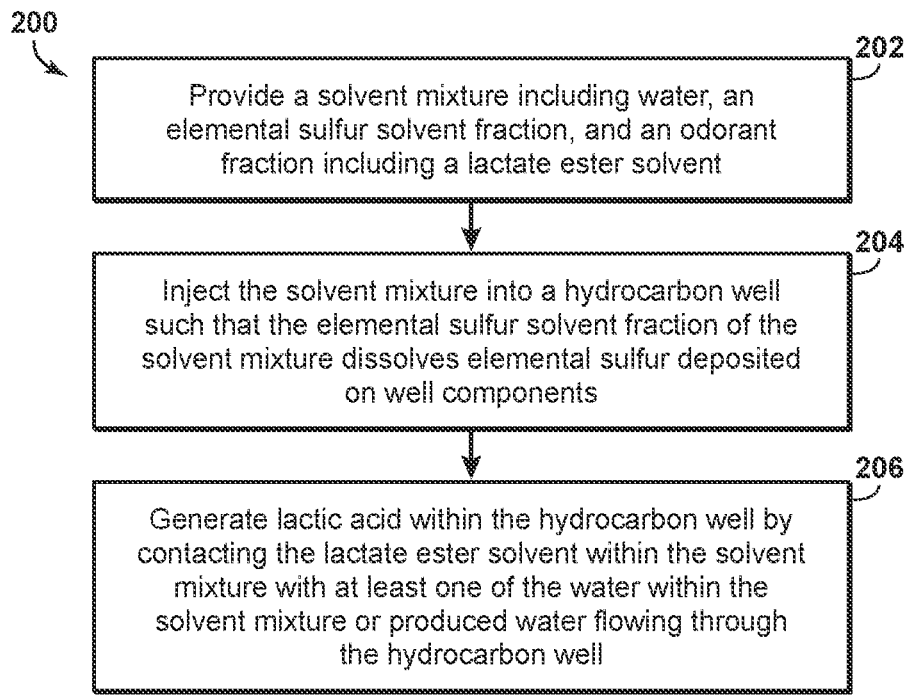
FIG. 2 is a process flow diagram of a method for in situ lactic acid generation within a hydrocarbon well.

FIG. 2 is a process flow diagram of a method 200 for in situ lactic acid generation within a hydrocarbon well. The method 200 begins at block 202, at which a solvent mixture including water, an elemental sulfur solvent fraction, and an odorant fraction that includes a lactate ester solvent is provided. In various embodiments, the solvent mixture is the same as, or similar to, the solvent mixture described with respect to FIG. 1. Moreover, as described with respect to FIG. 1, providing the solvent mixture may include increasing a temperature of the solvent mixture and/or adding a catalyst to the odorant fraction of the solvent mixture.

At block 204, the solvent mixture is injected into a hydrocarbon well such that the elemental sulfur solvent fraction of the solvent mixture dissolves elemental sulfur deposited on well components. In some embodiments, this includes flowing the solvent mixture through a production tubing of the hydrocarbon well such that elemental sulfur solvent fraction of the solvent mixture dissolves elemental sulfur deposited on a wall of the production tubing.

At block 206, lactic acid is generated within the hydrocarbon well by contacting the lactate ester solvent within the solvent mixture with at least one of the water within the solvent mixture or produced water flowing through the hydrocarbon well. Further, in some embodiments, the solvent mixture including the lactic acid is then used to stimulate the near-wellbore region of the formation.

The process flow diagram of FIG. 2 is not intended to indicate that the steps of the method 200 are to be executed in any particular order, or that all of the steps of the method 200 are to be included in every case. Further, any number of additional steps not shown in FIG. 2 may be included within the method 200, depending on the details of the specific implementation.

As may be appreciated, the solvent mixture may include various combinations of components. For example, the solvent mixture may include an elemental sulfur solvent fraction (having at least one elemental sulfur solvent); and an odorant fraction (having at least one odorant). The one odorant may include at least 20 wt % and at most 70 wt % of a lactate ester solvent; while the elemental sulfur solvent fraction forms at least 20 wt % and at most 80 wt % of the solvent mixture, and the odorant fraction forms at least 20 wt % and at most 80 wt % of the solvent mixture. The combination of the elemental sulfur solvent fraction and the odorant fraction is equal to or less than 100 wt % of the solvent mixture or the total amount of components in the solvent mixture is 100 wt % (e.g., does not exceed 100 wt %). In some embodiments, the solvent mixture may include a primary amine or MEA, a secondary amine or DEA, a MDEA and no water or MDEA and water. In the following examples, the solvent mixture utilized includes about 8.33 wt % MDEA, 16.667 wt % MEK, 29.167 wt % DMDS, 12.5 wt % H2O, 25 wt % ethyl lactate, and 8.3335 wt % acetone.

Figure 3:
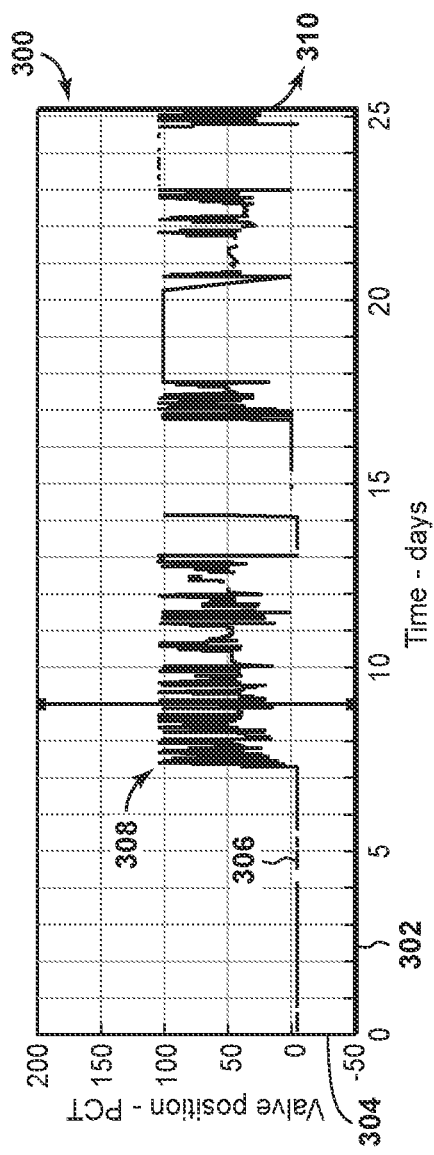
FIG. 3 is a graph of valve position changes over time in accordance with an embodiment of the present techniques.

FIG. 3 is a graph 300 of valve position changes over time in accordance with an embodiment of the present techniques. In this graph 300, a response 306 is shown based on the time, which is shown along axis 302 that is measured in period of days, along the valve position, which is shown along the axis 304 that is measured in percentage open (PCT open). As shown in this graph, the manifold valve positon of the well is shown along the response 306, which is 0 PCT open for the time period from period 1 to period 7 prior to traditional coil tubing work. Then, as shown by the change in the response at time 308, the manifold valve position of the well increases to between 40 PCT open and 100 PCT open for the time period from period 7 to period 13. This manifold valve position increased results from traditional coil tubing work into the well at period 7. This flow rate increase post traditional coil tubing work ranged from 15 to 20 thousand standard cubic feet (MSCF). In this graph, time 310 illustrates after solvent mixture injection, which resulted in flow rates that ranged steadily from 15 MSCF to 25 MSCF at a reduced manifold valve position ranging from 20 PCT open to 28 PCT open. This result is an enhancement as compared to conventional coil tubing approaches, which involved a valve position of 40.0041 PCT open for this well, while the valve position for the solvent mixture operations was 27.0005 PCT open.

Figure 4:
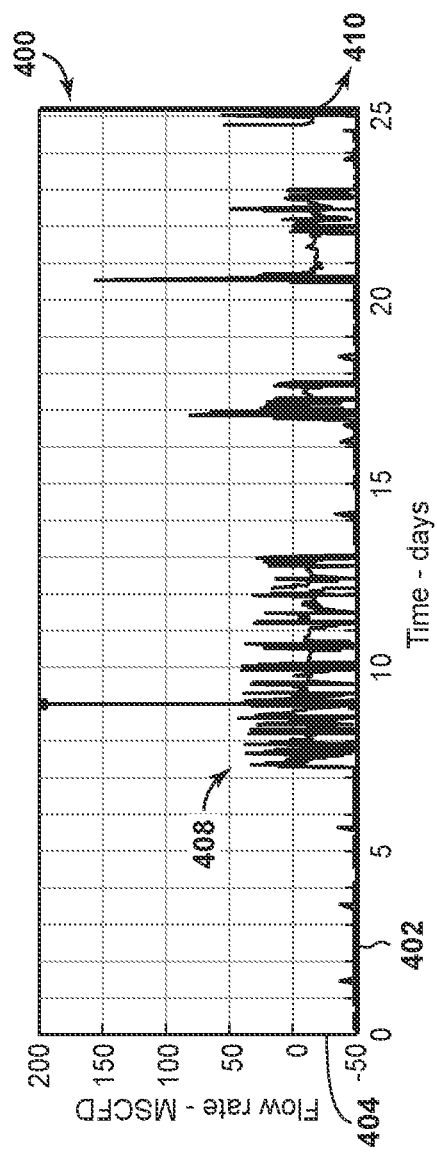
FIG. 4 is a graph of flow rate changes over time in accordance with an embodiment of the present techniques.

FIG. 4 is a graph 400 of flow rate changes over time in accordance with an embodiment of the present techniques. In this graph 400, a response 406 is shown based on the time, which is shown along axis 402 that is measured in period of days, along the flow rate, which is shown along the axis 404 that is measured in thousand standard cubic feet per day (MSCFD). As shown in this graph, the flow rate of the well as shown along the response 406 is between 0 MSCFD and 5 MSCFD for the time period from period 1 to period 7. Then, as shown by the change in the response at time 408, the flow rate of the well increases to between 5 MSCFD and 20 MSCFD steadily for the time period from period 7 to period 13. This flow rate increase results from conventional coil tubing of cleaning the well as shown at period 7. At time 410, the flow rate increase is a result of the reaction of the solvent mixture with the core material in the well. The flow rate is provided at time 410 is at reduced manifold valve position and ranged steadily from 15 MSCFD to 25 MSCFD for over a 1 month timeframe. The day rate indicated in the figured at time 410 was close to 19 MSCFD at a manifold valve position of 27 percent open post solvent mixture injection. This result is an enhancement as compared to conventional coil tubing approaches, which involved a valve position range of 40 PCT open to 50 PCT open for this well, while the valve position for the solvent mixture operations was restricted 13 to 20 PCT more ranging from 20 to 27 PCT open over a one month timeframe. Beneficially, this illustrates the fact that solvent mixture increased the permeability of the core of the reservoir enough to provide more or similar gas flow through valve positions that are more restricted than conventional tubing operations. This aspect is shown by coil tubing valve positions at 40 PCT open and 20 MSCF flow rate as compared to valve positions of 20 PCT open to 27 PCT open and flow rates from 19 MSCF to 25 MCSF for solvent mixture operations.

Figure 5:
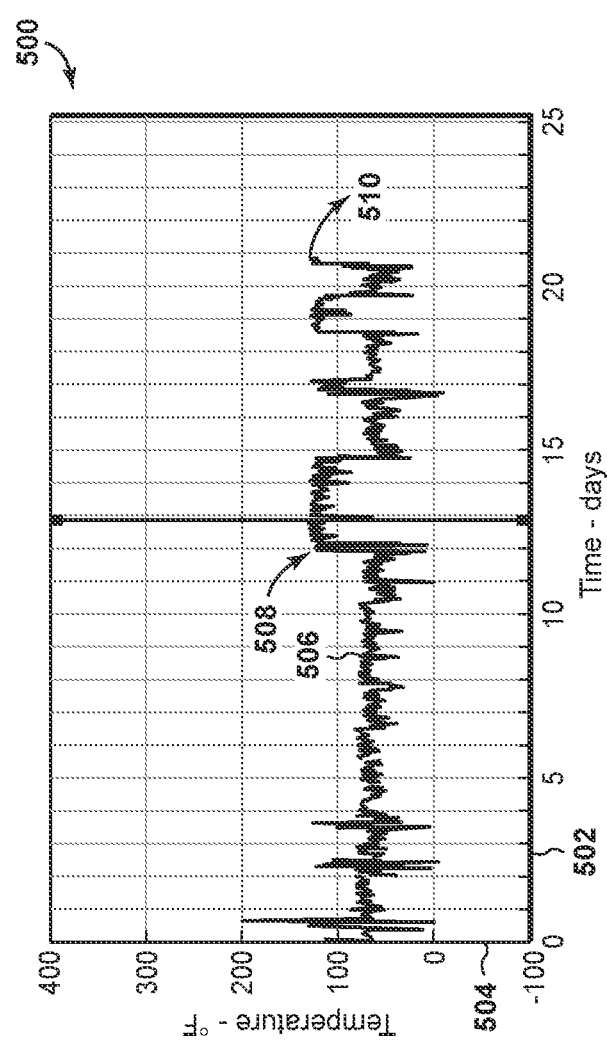
FIG. 5 is a graph of temperature changes over time in accordance with an embodiment of the present techniques.

FIG. 5 is a graph 500 of temperature changes over time in accordance with an embodiment of the present techniques. In this graph 500, a response 506 is shown based on the time, which is shown along axis 502 that is measured in period of days, along the temperature, which is shown along the axis 504 that is measured in degrees Fahrenheit (° F.). As shown in this graph, the temperature of the well as shown along the response 506 is generally between 50° F. and 100° F. for the time period from period 1 to period 12. Then, as shown by the change in the response at time 508, the temperature of the well increases to between 100° F. and 112° F. for the time period from period 12 to period 15. This temperature increase reflects typical well flowing temperature post traditional coil tubing work (e.g., about 112.5691° F.). At time 510, the well temperature increases even more as a result of the reaction of the solvent mixture with the core material in the well. The average well flowing temperatures post solvent mixture injection was around 124° F. (e.g., 124.6551° F.), which is roughly 12° F. higher than conventional coil tubing/acid cleaning operations.

Figure 6:
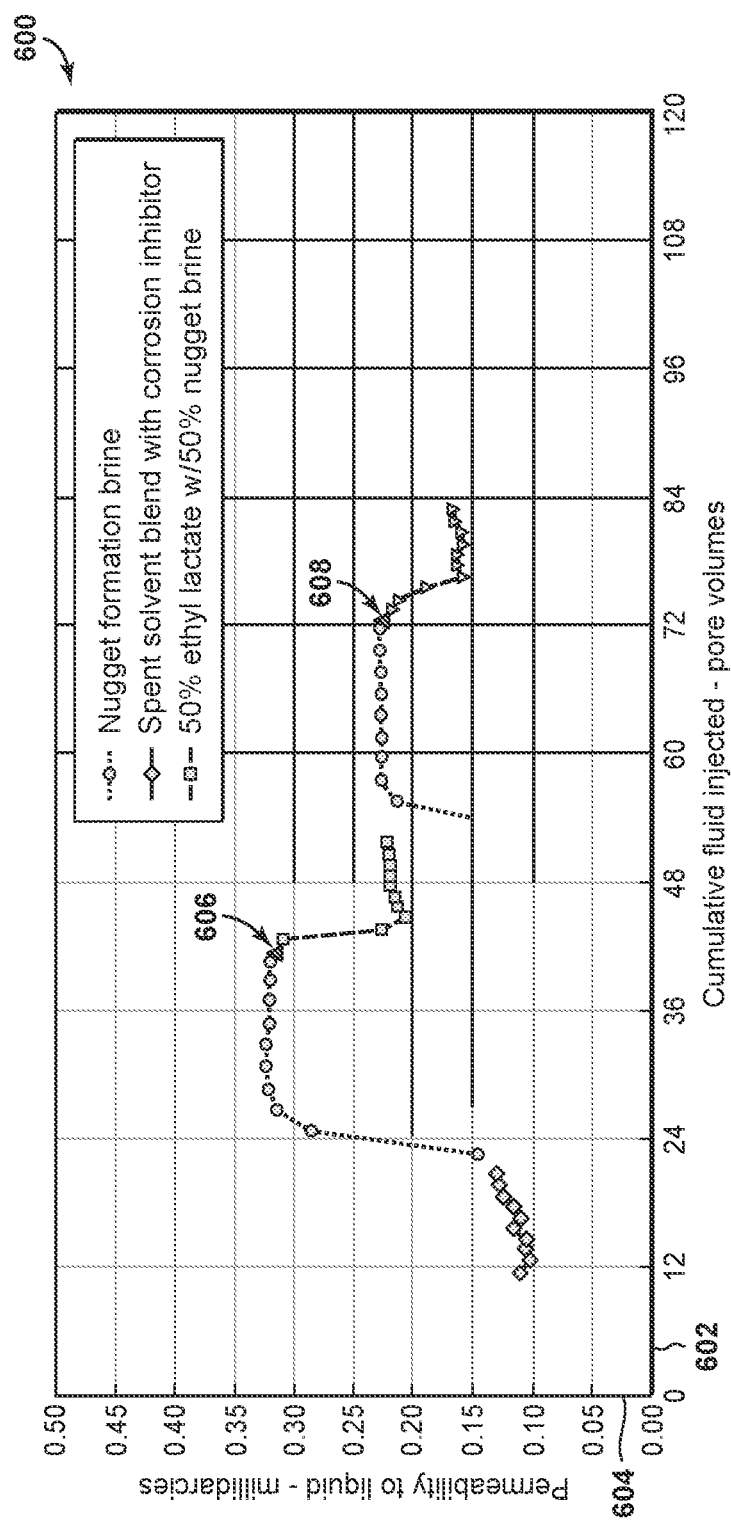
FIG. 6 is a graph of permeability over fluid injected in accordance with an embodiment of the present techniques.

FIG. 6 is a graph 600 of permeability over fluid injected in accordance with an embodiment of the present techniques. In this graph 600, a response 606 is shown as illustrating increase in permeability with production brine post injection of the solvent mixture, while a response 608 is shown for another cleaning fluid, which is ethylene glycol monobutyl ether EGMBE for this example. The responses 606 and 608 (respective production brine response flows) are illustrated by graphing cumulative fluid injected or pore volumes on the x axis 602 as compared with permeability to liquid in millidarcies on the y axis 604. As shown in this graph, the permeability of the core material along the response 606 is initially between 0.10 and 0.15 millidarcies for the cumulative amount of solvent mixture injected, which was from 12 pore volumes to 22 pore volumes. Then, as shown by the change in the response 606, the permeability increases to between 0.28 millidarcies and 0.35 millidarcies for the production brine fluid after spent solvent mixture is injected from 22 pore volumes to 42 pore volumes. The results illustrate that solvent mixture increases core space to allow more disposal or production brine over time. The permeability of the core material along the response 608 is initially between 0.10 and 0.15 millidarcies for the cumulative amount of other cleaning fluid injected, which was from 54 pore volumes to 56 pore volumes. Then, as shown by the change in the response 608, the permeability increases to between 0.20 millidarcies and 0.23 millidarcies for the production brine fluid after spent other cleaning fluid mixture is injected from 58 pore volumes to 72 pore volumes. As such, the solvent mixture of the present techniques provides enhancements over the other cleaning fluid (i.e. EGMBE).

The solvent mixture of the present techniques provides enhanced operations because the solvent mixture contains disulfide chemistry, while maintaining ability to enhance core permeability.

Figure 7:
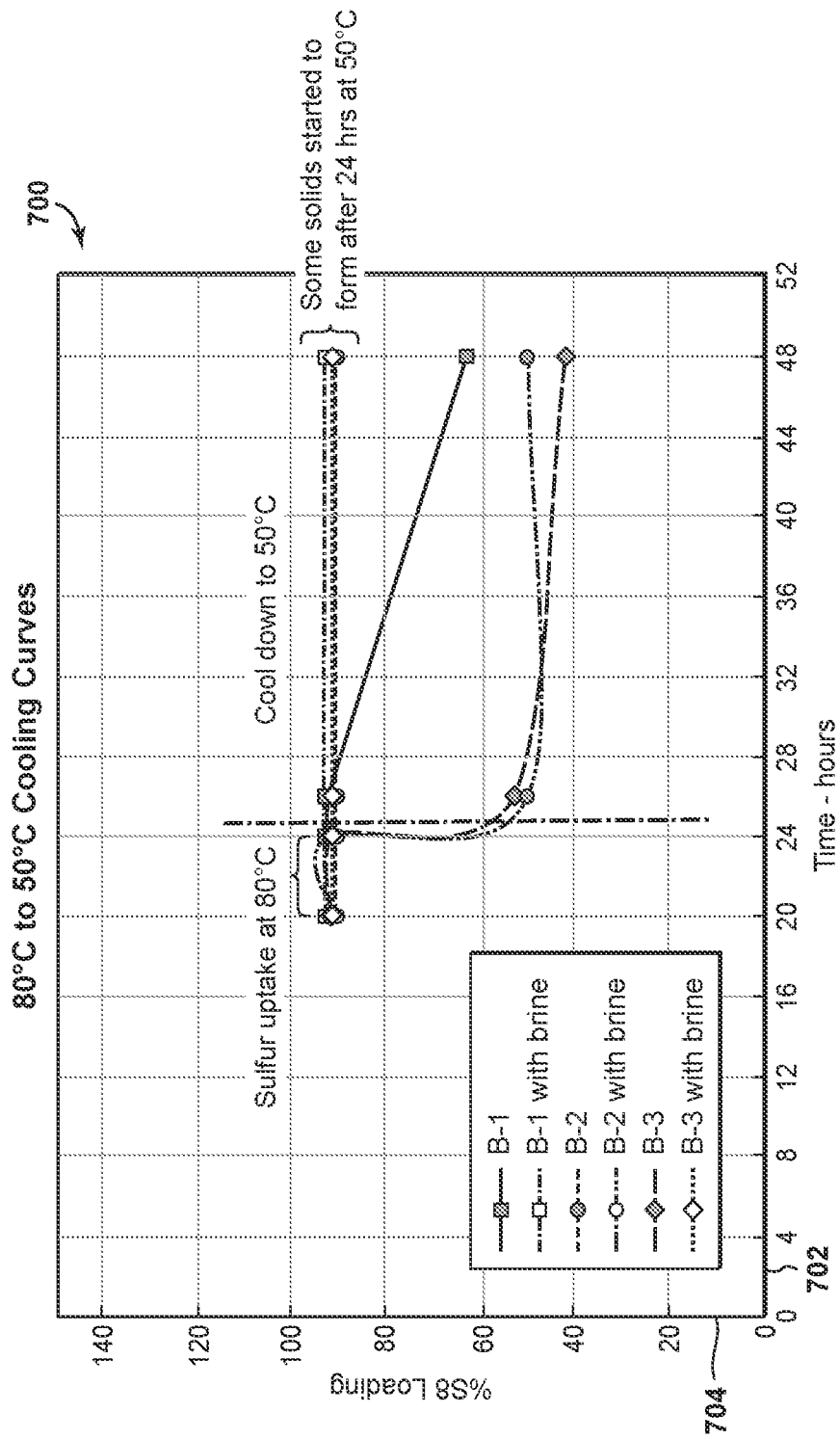
FIG. 7 is a graph of cooling curves over time in accordance with an embodiment of the present techniques.

FIG. 7 is a graph of cooling curves over time in accordance with an embodiment of the present techniques. In this graph 700, various responses are shown based on the time, which is shown along axis 702 that is measured in hours, relative to the percentage of S8 loading, which is shown along the axis 704 and is measured in weight percentage (wt %). As shown in this graph and unlike traditional disulfide chemistries, the ability of DMDS to uptake sulfur is marginally affected by the water added to the solvent mixture in response to a 30° C. temperature drop over a 24 hour period. Typically, water causes DMDS to drop out sulfur. The solvent mixture was designed to work against sulfur drop when contacted with water by forming lactic acid and ethanol. The lactic acid works well for stimulating reservoirs, but also provides a suitable environment for suspending sulfur dropout due to solvent cooling overtime.

Figure 8:
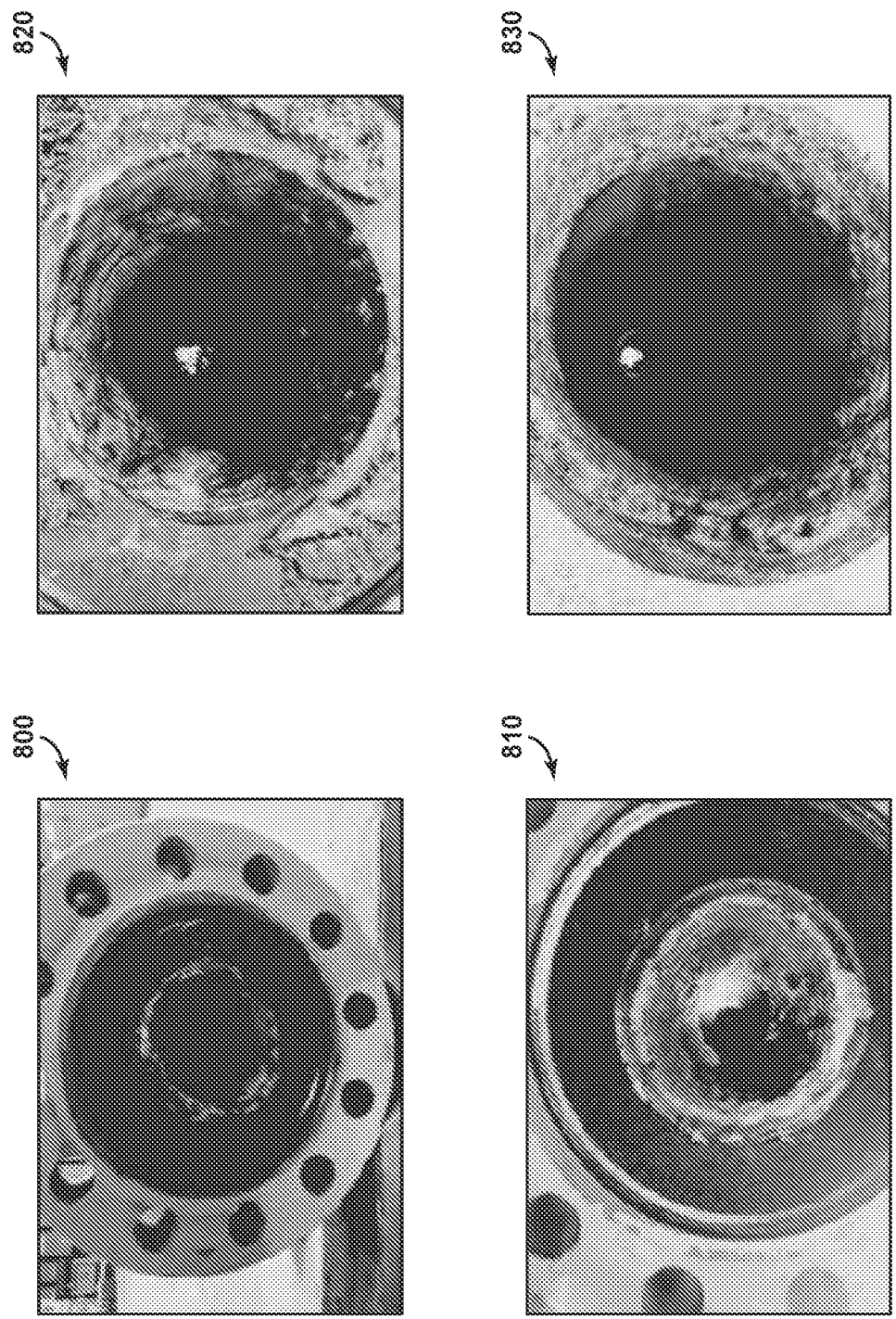
FIG. 8 is exemplary images of a tubular member before and after treatment with the solvent mixture in accordance with an embodiment of the present techniques.

FIG. 8 is exemplary images 800, 810, 820 and 830 of a tubular member before and after treatment with the solvent mixture in accordance with an embodiment of the present techniques. Before treatment with the solvent mixture, image 900 is a first end of a tubular member before treatment, while image 810 is of a second end of the same tubular member before treatment. As may be appreciated, the path through the tubular member is caked with Sulfur. Then, a sulfur uptake test was performed, which lasted roughly 2 hours, but the cooling process took 24 hours. After treatment with the solvent mixture, the image 820 is the first end of the tubular member after treatment, while image 830 is the second end of the tubular member after treatment. The treatment allowed 60 wt % percent uptake of elemental sulfur from the tubular at 140° F. and softened up the elemental sulfur on the tubular enough to allow residual removal of debris for the pipe wall with light pressure washing.

The present techniques may be susceptible to various modifications and alternative forms, such as the following embodiments as noted in paragraphs 1 to 34:

1. A method for dissolving or removing elemental sulfur within a hydrocarbon well and stimulating a formation through which the hydrocarbon well extends, comprising: providing a solvent mixture, wherein the solvent mixture comprises: an elemental sulfur solvent fraction comprising at least one elemental sulfur solvent; and an odorant fraction comprising at least one odorant, wherein the at least one odorant comprises at least 20 wt % and at most 70 wt % of a lactate ester solvent; wherein the elemental sulfur solvent fraction forms at least 20 wt % and at most 80 wt % of the solvent mixture, and the odorant fraction forms at least 20 wt % and at most 80 wt % of the solvent mixture (wherein the combination of the elemental sulfur solvent fraction and the odorant fraction is equal to or less than 100 wt % of the solvent mixture (the total amount of components in the solvent fraction is 100 wt %, which does not exceed 100 wt %); injecting the solvent mixture into a hydrocarbon well such that the elemental sulfur solvent fraction of the solvent mixture dissolves, interacts or removes elemental sulfur deposited on well components; contacting the solvent mixture with water such that the lactate ester solvent within the odorant fraction reacts with the water to generate lactic acid; and stimulating a formation through which the hydrocarbon well extends by flowing the solvent mixture comprising the lactic acid through the hydrocarbon well and into the formation.

2. The method of paragraph 1, wherein providing the solvent mixture comprises combining the elemental sulfur solvent fraction with the odorant fraction; wherein the elemental sulfur solvent fraction comprises a solvent odor and a solvent sulfur solubility of at least 10 weight percent (wt %) at standard temperature and pressure (STP), and the odorant fraction comprises an odorant odor that differs from the solvent odor; and wherein the presence of the odorant fraction within the solvent mixture decreases at least one of an intensity or an offensiveness of a mixture odor of the solvent mixture relative to the solvent odor.

3. The method of paragraph 1 or 2, wherein contacting the solvent mixture with the water comprises allowing produced water flowing through the hydrocarbon well to react with the lactate ester solvent within the solvent mixture to generate the lactic acid.
4. The method of any of paragraphs 1 to 3, wherein providing the solvent mixture comprises adding at least 5 wt % and at most 20 wt % water directly to the solvent mixture.
5. The method of paragraph 4, wherein contacting the solvent mixture with the water comprises allowing the water within the solvent mixture to react with the lactate ester solvent within the solvent mixture to generate the lactic acid.
6. The method of any of paragraphs 1 to 5, wherein providing the solvent mixture comprises increasing a temperature of the solvent mixture to at least 95° F.
7. The method of paragraph 6, wherein increasing the temperature of the solvent mixture comprises flowing the solvent mixture through a hot oiler truck or a heat exchanger before injecting the solvent mixture into the hydrocarbon well.
8. The method of any of paragraphs 1 to 7, wherein providing the solvent mixture comprises adding at least 5 wt % and at most 15 wt % of a catalyst to the odorant fraction, wherein the catalyst increases a reaction rate between the lactate ester solvent and the water.
9. The method of paragraph 8, wherein the catalyst comprises methyldiethanolamine (MDEA).
10. The method of any of paragraphs 1 to 9, wherein injecting the solvent mixture into the hydrocarbon well such that the elemental sulfur solvent fraction of the solvent mixture dissolves the elemental sulfur deposited on the well components comprises flowing the solvent mixture through a production tubing of the hydrocarbon well such that the elemental sulfur solvent fraction of the solvent mixture dissolves elemental sulfur deposited on a wall of the production tubing.
11. The method of any of paragraphs 1 to 10, comprising removing the elemental sulfur from the hydrocarbon well by flowing the solvent mixture out of the hydrocarbon well.
12. The method of paragraph 11, wherein flowing the solvent mixture out of the hydrocarbon well comprises at least one of: collecting the solvent mixture within a separator located at a surface; or flowing the solvent mixture into a sour water disposal well.
13. The method of any of paragraphs 1 to 12, wherein the lactate ester solvent comprises at least one of ethyl lactate or methyl lactate.
14. The method of any of paragraphs 1 to 13, wherein the elemental sulfur solvent fraction comprises dimethyl disulfide (DMDS).
15. A solvent mixture, the solvent mixture having a mixture odor and comprising: an elemental sulfur solvent fraction comprising at least one elemental sulfur solvent with a solvent odor and a solvent sulfur solubility of at least 10 weight percent (wt %) at standard temperature and pressure (STP); and an odorant fraction comprising at least one odorant with an odorant odor that differs from the solvent odor, wherein the at least one odorant comprises at least 20 wt % and at most 70 wt % of a lactate ester solvent; wherein the elemental sulfur solvent fraction forms at least 20 wt % and at most 80 wt % of the solvent mixture, and the odorant fraction forms at least 20 wt % and at most 80 wt 20% of the solvent mixture; wherein the presence of the odorant fraction within the solvent mixture decreases at least one of an intensity or an offensiveness of the mixture odor relative to the solvent odor; and wherein the lactate ester solvent within the odorant fraction reacts with water to form lactic acid.
16. The solvent mixture of paragraph 15, wherein the lactate ester solvent comprises at least one of ethyl lactate or methyl lactate.
17. The solvent mixture of paragraph 15 or 16, wherein the solvent mixture further comprises at least 5 wt % and at most 20 wt % water.
18. The solvent mixture of any of paragraphs 15 to 17, wherein a temperature of the solvent mixture is at least 95° F.
19. The solvent mixture of any of paragraphs 15 to 18, wherein the at least one odorant within the odorant fraction also comprises at least 5 wt % and at most 15 wt % of a catalyst that increases a reaction rate between the lactate ester solvent and the water.
20. The solvent mixture of paragraph 19, wherein the catalyst comprises methyldiethanolamine (MDEA).
21. The solvent mixture of any of paragraphs 15 to 20, wherein the elemental sulfur solvent fraction comprises dimethyl disulfide (DMDS).
22. The solvent mixture of paragraph 21, wherein the DMDS comprises at least 20 wt % and at most 40 wt % of the elemental sulfur solvent fraction.
23. The solvent mixture of any of paragraphs 15 to 22, wherein the odorant fraction further comprises at least one of: at least 5 wt % and at most 15 wt % acetone; or at least 10 wt % and at most 30 wt % methyl ethyl ketone (MEK).
24. The solvent mixture of any of paragraphs 15 to 23, wherein the odorant fraction further comprises at least 3 wt % and at most 22 wt % of an amine.
25. The solvent mixture of paragraph 24, wherein the amine comprises at least one of monoethanolamine (MEA), diethanolamine (DEA), triethanolamine (TEA), or methyldiethanolamine (MDEA).
26. The solvent mixture of any of paragraphs 15 to 25, wherein a mixture sulfur solubility of the elemental sulfur within the solvent mixture is at least 10% and at most 90% of the solvent sulfur solubility.
27. The solvent mixture of any of paragraphs 15 to 26, wherein the elemental sulfur solvent fraction comprises at least one of dimethyl disulfide (DMDS), methanol, isopropanol, diethanolamine (DEA), acetone, diaryl disulfide (DADS), carbon disulfide, toluene, or an organic elemental sulfur solvent.
28. The solvent mixture of any of paragraphs 15 to 27, wherein the presence of the odorant fraction within the solvent mixture decreases the intensity of the mixture odor, relative to the solvent odor, by at least 1 on an Odor Intensity Referencing Scale.
29. The solvent mixture of any of paragraphs 15 to 28, wherein the presence of the odorant fraction within the solvent mixture decreases the offensiveness of the mixture odor, relative to the solvent odor, by at least 1 on an Odor Offensiveness Referencing Scale.
30. The solvent mixture of any of paragraphs 15 to 29, wherein the odorant fraction further comprises at least one of a ketone, acetone, methyl ethyl ketone (MEK), an amine, monoethanolamine (MEA), diethanolamine (DEA), triethanolamine (TEA), methyldiethanolamine (MDEA), an ester, an aromatic compound, or a sulfurous compound.

31. A method for in situ lactic acid generation within a hydrocarbon well, comprising: providing a solvent mixture comprising water, an elemental sulfur solvent fraction comprising at least one elemental sulfur solvent, and an odorant fraction comprising at least one odorant, the at least one odorant comprising a lactate ester solvent; injecting the solvent mixture into a hydrocarbon well such that the elemental sulfur solvent fraction of the solvent mixture dissolves elemental sulfur deposited on well components; and generating lactic acid within the hydrocarbon well by contacting the lactate ester solvent within the solvent mixture with at least one of the water within the solvent mixture or produced water flowing through the hydrocarbon well.

32. The method of paragraph 31, wherein providing the solvent mixture comprises combining the water, the elemental sulfur solvent fraction, and the odorant fraction; wherein the elemental sulfur solvent fraction has a solvent odor, and the odorant fraction has an odorant odor that differs from the solvent odor; and wherein the presence of the odorant fraction within the solvent mixture decreases at least one of an intensity or an offensiveness of a mixture odor of the solvent mixture relative to the solvent odor.

33. The method of paragraph 31 or 32, wherein providing the solvent mixture comprises increasing a temperature of the solvent mixture.

34. The method of any of paragraphs 31 to 33, wherein providing the solvent mixture comprises adding a catalyst to the odorant fraction, wherein the catalyst increases a reaction rate between the lactate ester solvent and the water.

35. The method of any of paragraphs 31 to 34, further comprising stimulating a formation through which the hydrocarbon well extends by flowing the solvent mixture comprising the lactic acid through the hydrocarbon well and into the formation.

Embodiments described herein relate to downhole, or subsurface, applications of the solvent mixture. However, the solvent mixture may also be used to remove elemental sulfur from surface components and/or to generate lactic acid for surface applications. Moreover, while the embodiments described herein are well-calculated to achieve the advantages set forth, it will be appreciated that the embodiments described herein are susceptible to modification, variation, and change without departing from the spirit thereof. Indeed, the present techniques include all alternatives, modifications, and equivalents falling within the true spirit and scope of the appended claims.

What is claimed is:

1. A method for in situ lactic acid generation within a hydrocarbon well, comprising:
   providing a solvent mixture comprising water, an elemental sulfur solvent fraction comprising at least one elemental sulfur solvent, and an odorant fraction comprising at least one odorant, the at least one odorant comprising a lactate ester solvent;
   injecting the solvent mixture into a hydrocarbon well such that the elemental sulfur solvent fraction of the solvent mixture dissolves elemental sulfur deposited on well components; and
   generating lactic acid within the hydrocarbon well by contacting the lactate ester solvent within the solvent mixture with at least one of the water within the solvent mixture or produced water flowing through the hydrocarbon well.

2. The method of claim 1, wherein providing the solvent mixture comprises combining the water, the elemental sulfur solvent fraction, and the odorant fraction; wherein the elemental sulfur solvent fraction has a solvent odor, and the odorant fraction has an odorant odor that differs from the solvent odor; and wherein the presence of the odorant fraction within the solvent mixture decreases at least one of an intensity or an offensiveness of a mixture odor of the solvent mixture relative to the solvent odor.

3. The method of claim 1, wherein providing the solvent mixture comprises increasing a temperature of the solvent mixture.

4. The method of claim 1, wherein providing the solvent mixture comprises adding a catalyst to the odorant fraction, wherein the catalyst increases a reaction rate between the lactate ester solvent and the water.

5. The method of claim 1, further comprising stimulating a formation through which the hydrocarbon well extends by flowing the solvent mixture comprising the lactic acid through the hydrocarbon well and into the formation.

6. The method of claim 1, wherein:
   the at least one odorant comprises at least 20 wt % and at most 70 wt % of the lactate ester solvent;
   the elemental sulfur solvent fraction forms at least 20 wt % and at most 80 wt % of the solvent mixture, and the odorant fraction forms at least 20 wt % and at most 80 wt % of the solvent mixture; and
   a formation through which the hydrocarbon well extends being stimulated by flowing the solvent mixture comprising the lactic acid through the hydrocarbon well and into the formation.

7. The method of claim 6, wherein providing the solvent mixture comprises combining the elemental sulfur solvent fraction with the odorant fraction; wherein the elemental sulfur solvent fraction comprises a solvent odor and a solvent sulfur solubility of at least 10 weight percent (wt %) at standard temperature and pressure (STP), and the odorant fraction comprises an odorant odor that differs from the solvent odor; and wherein the presence of the odorant fraction within the solvent mixture decreases at least one of an intensity or an offensiveness of a mixture odor of the solvent mixture relative to the solvent odor.

8. The method of claim 1, wherein contacting the solvent mixture with the water comprises allowing produced water flowing through the hydrocarbon well to react with the lactate ester solvent within the solvent mixture to generate the lactic acid.

9. The method of claim 1, wherein providing the solvent mixture comprises adding at least 5 wt % and at most 20 wt % water directly to the solvent mixture.

10. The method of claim 1, wherein providing the solvent mixture comprises increasing a temperature of the solvent mixture to at least 95° F.

11. The method of claim 1, wherein providing the solvent mixture comprises adding at least 5 wt % and at most 15 wt % of a catalyst to the odorant fraction, wherein the catalyst increases a reaction rate between the lactate ester solvent and the water.

12. The method of claim 1, wherein injecting the solvent mixture into the hydrocarbon well such that the elemental sulfur solvent fraction of the solvent mixture dissolves the elemental sulfur deposited on the well components comprises flowing the solvent mixture through a production tubing of the hydrocarbon well such that the elemental sulfur solvent fraction of the solvent mixture dissolves elemental sulfur deposited on a wall of the production tubing.

13. The method of claim 1, comprising removing the elemental sulfur from the hydrocarbon well by flowing the solvent mixture out of the hydrocarbon well.

14. The method of claim 1, wherein:
the solvent mixture has a mixture odor:
the at least one elemental sulfur solvent has a solvent odor and a solvent sulfur solubility of at least 10 weight percent (wt %) at standard temperature and pressure (STP); and
the at least one odorant has an odorant odor that differs from the solvent odor, wherein the at least one odorant comprises at least 20 wt % and at most 70 wt % of the lactate ester solvent;
wherein the elemental sulfur solvent fraction forms at least 20 wt % and at most 80 wt % of the solvent mixture, and the odorant fraction forms at least 20 wt % and at most 80 wt % of the solvent mixture;
wherein the presence of the odorant fraction within the solvent mixture decreases at least one of an intensity or an offensiveness of the mixture odor relative to the solvent odor; and
wherein the lactate ester solvent within the odorant fraction reacts with water to form lactic acid.

15. The method of claim 14, wherein the lactate ester solvent comprises at least one of ethyl lactate or methyl lactate.

16. The method of claim 14, wherein the at least one odorant within the odorant fraction also comprises at least 5 wt % and at most 15 wt % of a catalyst that increases a reaction rate between the lactate ester solvent and the water.

17. The method of claim 14, wherein the odorant fraction further comprises at least 3 wt % and at most 22 wt % of an amine.

18. The method of claim 14, wherein a mixture sulfur solubility of the elemental sulfur within the solvent mixture is at least 10% and at most 90% of the solvent sulfur solubility.

19. The method of claim 14, wherein the presence of the odorant fraction within the solvent mixture decreases the intensity of the mixture odor, relative to the solvent odor, by at least 1 on an Odor Intensity Referencing Scale.

20. The method of claim 14, wherein the presence of the odorant fraction within the solvent mixture decreases the offensiveness of the mixture odor, relative to the solvent odor, by at least 1 on an Odor Offensiveness Referencing Scale.

* * * * *